(12) United States Patent
Yang

(10) Patent No.: US 11,750,098 B2
(45) Date of Patent: Sep. 5, 2023

(54) VOLTAGE CONVERSION CIRCUIT HAVING SELF-ADAPTIVE MECHANISM

(71) Applicant: REALTEK SEMICONDUCTOR CORPORATION, Hsinchu (TW)

(72) Inventor: Jun Yang, Suzhou (CN)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 115 days.

(21) Appl. No.: 17/562,388

(22) Filed: Dec. 27, 2021

(65) Prior Publication Data

US 2022/0337158 A1  Oct. 20, 2022

(30) Foreign Application Priority Data

Apr. 15, 2021 (CN) .......................... 202110404408.5

(51) Int. Cl.
*H02M 3/158* (2006.01)
*H02M 3/16* (2006.01)

(52) U.S. Cl.
CPC ............. *H02M 3/158* (2013.01); *H02M 3/16* (2013.01)

(58) Field of Classification Search
CPC .......... H02M 3/158; H02M 3/16; H02M 1/10; H02M 1/08; H02M 3/1584
See application file for complete search history.

(56) References Cited

U.S. PATENT DOCUMENTS

| | | | |
|---|---|---|---|
| 10,185,336 B2 * | 1/2019 | Chen | ........................ H03K 5/24 |
| 2019/0286966 A1 * | 9/2019 | Zhang | .............. G06K 19/07749 |

* cited by examiner

*Primary Examiner* — Adolf D Berhane
*Assistant Examiner* — Afework S Demisse
(74) *Attorney, Agent, or Firm* — WPAT, P.C

(57) ABSTRACT

The present invention discloses a voltage conversion circuit having self-adaptive mechanism. A control branch includes a first resistor coupled between a second power supply and a control terminal, and a switch circuit that is coupled between the control terminal and a ground terminal and receives an input voltage from an input terminal to generate a control voltage at the control terminal. A voltage-withstanding P-type transistor circuit of an output branch is coupled between the second power supply and the output terminal that generates an output voltage and is controlled by the control voltage. A voltage-withstanding N-type transistor circuit of the output branch is coupled between the output terminal and the ground terminal and is controlled by an inverted input voltage. When the input voltage is at a first power domain high/low state, the output voltage is at a second power domain high/low state.

10 Claims, 5 Drawing Sheets

VOLTAGE CONVERSION CIRCUIT HAVING SELF-ADAPTIVE MECHANISM

BACKGROUND OF THE INVENTION

1. Field of the Invention

The present invention relates to a voltage conversion circuit having self-adaptive mechanism.

2. Description of Related Art

Signal transmission is required to be performed between different circuits or chips. However, different circuits or chips may operate according to different power supplies having different voltages. In order to guarantee the signals to be transmitted correctly between different circuits or chips, a voltage level shifting circuit that increases or decreases the voltage levels of the signal is required.

Nevertheless, between two different circuits or chips, the voltage of the power supply of a former circuit may be either larger or lower than the voltage of the power supply of a latter circuit. If a single voltage conversion circuit capable of dealing with the signal transmitted between the circuits having different voltage relations is absent, different circuits corresponding to different voltage relations need to be used to perform voltage conversion. The voltage conversion can not be performed elastically.

SUMMARY OF THE INVENTION

In consideration of the problem of the prior art, an object of the present invention is to supply a voltage conversion circuit having self-adaptive mechanism.

The present invention discloses a voltage conversion circuit having self-adaptive mechanism configured to convert an input voltage corresponding to a first power domain to an output voltage corresponding to a second power domain, wherein a first power domain high state of the first power domain corresponds to a first supply voltage and a second power domain high state of the second power domain corresponds to a second supply voltage. The voltage conversion circuit includes a control branch and an output branch. The control branch includes a first resistor and a switch circuit. The first resistor is electrically coupled between the second supply voltage and a control terminal. The switch circuit is electrically coupled between the control terminal and a ground terminal and is configured to receive an input voltage from an input terminal to generate a control voltage at the control terminal. The output branch includes a voltage-withstanding P-type transistor circuit and a voltage-withstanding N-type transistor circuit. The voltage-withstanding P-type transistor circuit is electrically coupled between the second power supply and an output terminal and is controlled by the control voltage, wherein the output terminal is configured to generate the output voltage. The voltage-withstanding N-type transistor circuit is electrically coupled between the output terminal and the ground terminal and is controlled by an inverted input voltage that is an inversion of the input voltage. When the input voltage is at the first power domain high state, the inverted input voltage is at a first power domain low state, the control voltage is a difference between the second supply voltage and the first supply voltage when the second supply voltage is larger than the first supply voltage and the control voltage is zero when the second supply voltage is not larger than the first supply voltage, and the output voltage is at the second power domain high state. When the input voltage is at the first power domain low state, the inverted input voltage is at the first power domain high state, the control voltage is the second supply voltage, and the output voltage is at a second power domain low state.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

An aspect of the present invention is to provide a voltage conversion circuit having self-adaptive mechanism to convert an input voltage at a first power domain into an output voltage in a second power domain no matter a first supply voltage of the first power domain is larger or smaller than a second supply voltage of the second power domain.

Figure 1:
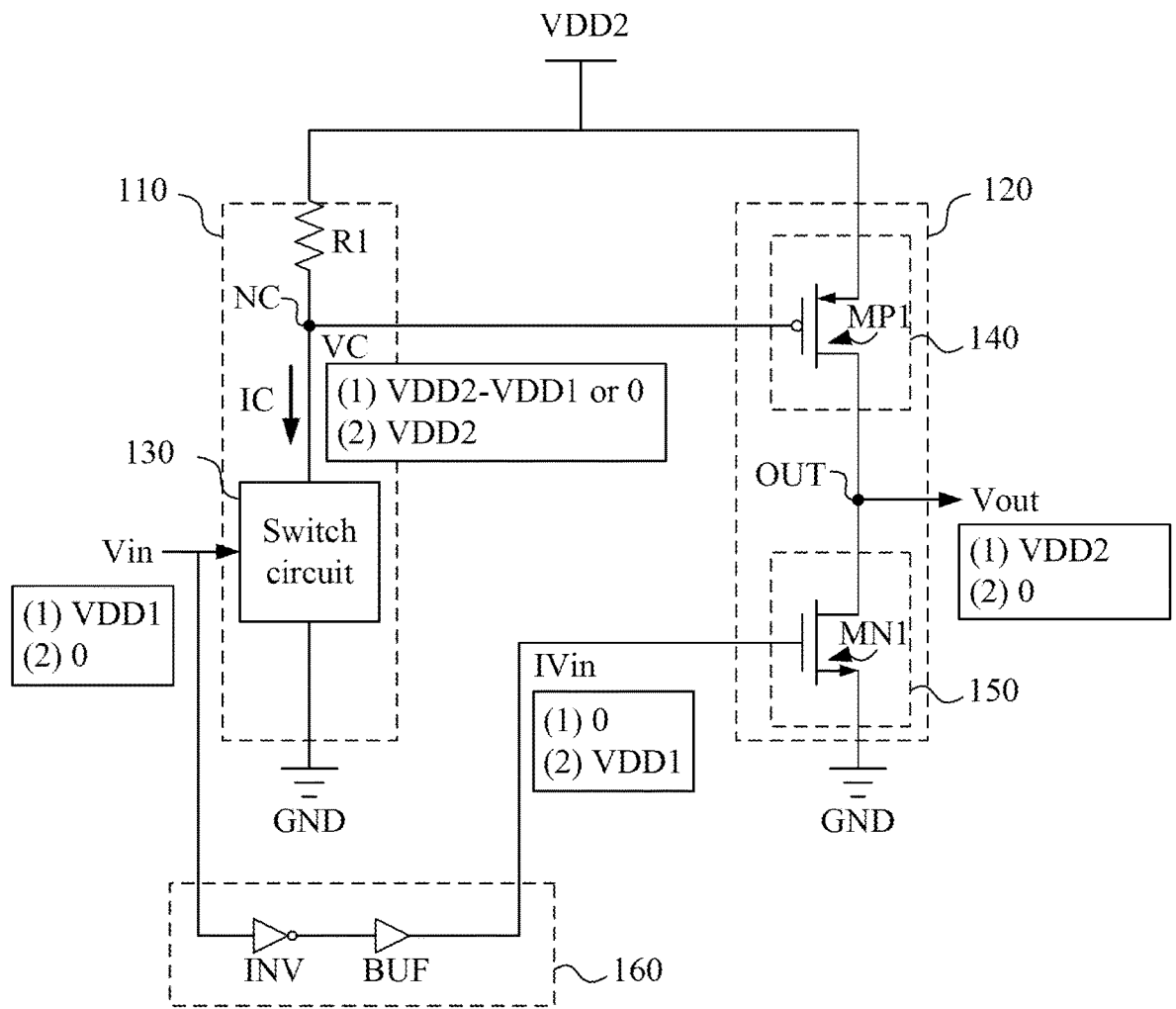
FIG. 1 illustrates a circuit diagram of a voltage conversion circuit having self-adaptive mechanism according to an embodiment of the present invention.

Reference is now made to FIG. 1. FIG. 1 illustrates a circuit diagram of a voltage conversion circuit 100 having self-adaptive mechanism according to an embodiment of the present invention.

The voltage conversion circuit 100 is configured to convert an input voltage Vin in a first power domain to an output voltage Vout in a second power domain. In an embodiment, the first power domain and the second power domain respectively correspond to different chips or different circuit blocks.

In the first power domain, the circuit components operate according to a first supply voltage VDD1. As a result, a high state of the first power domain corresponds to the first supply voltage VDD1 and a low state thereof corresponds to a ground voltage. In the second power domain, the circuit components operate according to a second supply voltage VDD2. As a result, a high state of the second power domain corresponds to the second supply voltage VDD2 and a low state thereof corresponds to a ground voltage. In a numerical example, the first supply voltage VDD1 is such as 3.3 volts. The second supply voltage VDD2 is such as either 5 volts, 3.3 volts or 1.8 volts. The ground voltage is 0 volt.

The voltage conversion circuit 100 includes a control branch 110 and an output branch 120.

The control branch 110 includes a first resistor R1 and a switch circuit 130. The first resistor R1 is electrically coupled between the second supply voltage VDD2 and a control terminal NC. The switch circuit 130 is electrically coupled between the control terminal NC and a ground terminal GND and is configured to receive the input voltage Vin from an input terminal IN to generate a control voltage VC at the control terminal NC.

Figure 2:
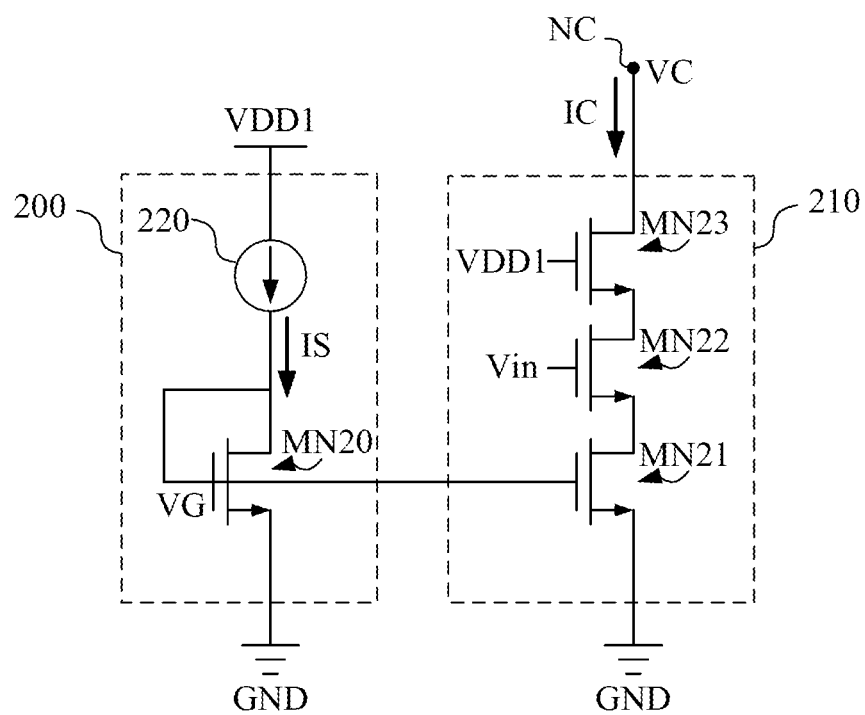
FIG. 2 illustrates a detailed circuit diagram of the switch circuit according to an embodiment of the present invention.

Reference is now made to FIG. 2 at the same time. FIG. 2 illustrates a detailed circuit diagram of the switch circuit 130 according to an embodiment of the present invention. In the present embodiment, the switch circuit 130 includes a driving branch 200 and a voltage generation branch 210.

The driving branch 200 includes a current source 220 and a diode-connected NMOS transistor MN20.

The current source 220 is configured to operate according to the first supply voltage VDD1 to generate a switch current IS.

The diode-connected NMOS transistor MN20 is electrically coupled between the current source 220 and the ground terminal GND. Since the diode-connected NMOS transistor MN20 is in a diode-connected form, a gate thereof is electrically coupled to a drain thereof. As a result, the gate voltage VG of the diode-connected NMOS transistor MN20 is the same as the drain voltage thereof, in which the gate voltage VG is generated according to the switch current IS. The diode-connected NMOS transistor MN20 is controlled to be turned on according to the gate voltage VG.

The voltage generation branch 210 includes a first NMOS transistor MN21, a second NMOS transistor MN22 and a third NMOS transistor MN23 electrically coupled in series between the control terminal NC and the ground terminal GND.

A gate of the first NMOS transistor MN21 is electrically coupled to the gate of the diode-connected NMOS transistor MN20. As a result, the first NMOS transistor MN21 is controlled by the gate voltage VG The second NMOS transistor MN22 is controlled by the input voltage Vin. The third NMOS transistor MN23 is controlled by the first supply voltage VDD1.

In an embodiment, a transistor W/L ratio of the first NMOS transistor MN21 is A times of the transistor W/L ratio of the diode-connected NMOS transistor MN20. As a result, the current source 220 is configured to keep an amount of the switch current IS be A times of a ratio between the first supply voltage VDD1 and a first resistance of the first resistor R1, in which the amount of the switch current IS is expressed as VDD1/(R1×A).

The output branch 120 includes a voltage-withstanding P-type transistor circuit 140 and a voltage-withstanding N-type transistor circuit 150.

The voltage-withstanding P-type transistor circuit 140 is electrically coupled between the second supply voltage VDD2 and an output terminal OUT and is controlled by the control voltage VC, wherein the output terminal OUT is configured to generate the output voltage Vout. In the present embodiment, the voltage-withstanding P-type transistor circuit 140 includes a PMOS transistor MP1, and the PMOS transistor MP1 is a laterally diffused metal oxide semiconductor (LDMOS) transistor.

The voltage-withstanding N-type transistor circuit 150 is electrically coupled between the output terminal OUT and the ground terminal GND and is controlled by the inverted input voltage IVin that is an inversion of the input voltage Vin. In the present embodiment, the voltage-withstanding N-type transistor circuit 150 includes a NMOS transistor MN1, and the NMOS transistor MN1 is a LDMOS transistor.

In an embodiment, the voltage conversion circuit 100 may further include an inverting circuit 160. The inverting circuit 160 includes an inverter INV and selectively includes a buffer BUF electrically coupled to the inverter INV in series, to receive the input voltage Vin and generate the inverted input voltage IVin.

In FIG. 1, a number of the buffer BUF is illustrated to be one. However, in practical usage, the number of the buffer BUF can be 0, 1 or more than 1 depending on practical requirement. More specifically, since the generation of the control voltage VC is based on the processing of the switch circuit 130, the number of the buffer BUF makes a time that the voltage-withstanding P-type transistor circuit 140 receives the control voltage VC and a time that the voltage-withstanding N-type transistor circuit 150 receives the inverted input voltage Vin substantially the same.

It is appreciated that the term "substantially the same" means that the time that the voltage-withstanding P-type transistor circuit 140 receives the control voltage VC and the time that the voltage-withstanding N-type transistor circuit 150 receives the inverted input voltage Vin are not necessarily completely the same and may include a difference within a reasonable range therebetween.

The operation of the voltage conversion circuit 100 is described in detail based on different types of input voltage Vin.

Under a first operation condition, the input voltage Vin is at a first power domain high state (VDD1). In FIG. 1, a label "(1)" is used to mark the voltage of each of the circuit nodes in the voltage conversion circuit 100 under the first operation condition.

Since the input voltage Vin is at the first power domain high state (VDD1), the inverted input voltage IVin is at a first power domain low state (0). Under such a condition, the voltage-withstanding N-type transistor circuit 150 is controlled to be turned off by the inverted input voltage Vin.

For the switch circuit 130, when the input voltage Vin is at the first power domain high state (VDD1), the second NMOS transistor MN22 in FIG. 2 is controlled to be turned on by the input voltage Vin such that the first NMOS transistor MN21 and the third NMOS transistor MN23 are turned on as well. Due to the relation of the ratio between the transistor W/L ratios of the first NMOS transistor MN21 and the diode-connected NMOS transistor MN20, a control current IC flowing through the voltage generation branch 210 is VDD1/R1.

As a result, when the control current IC flows through the first resistor R1 in FIG. 1, a largest voltage drop generated therefrom is VDD1 (R1×VDD1/R1). When the second supply voltage VDD2 is larger than the first supply voltage VDD1, the control voltage VC generated at the control terminal NC is VDD2−VDD1. When the second supply voltage VDD2 is not larger than the first supply voltage VDD1, the lowest level of the control voltage VC is 0 since the ground voltage of the ground terminal GND is 0.

Therefore, after receiving the input voltage Vin at the first power domain high state (VDD1), the switch circuit 130 makes the control voltage VC a difference between the second supply voltage VDD2 and the first supply voltage VDD1 (VDD2−VDD1) when the second supply voltage VDD2 is larger than the first supply voltage VDD1, and makes the control voltage VC to be zero when the second supply voltage VDD2 is not larger than the first supply voltage VDD1. Under such a condition, the voltage-withstanding P-type transistor circuit 140 is controlled to be turned on according to the control voltage VC.

Under such a condition, the turn-on of the voltage-withstanding P-type transistor circuit 140 injects a current from the second supply voltage VDD2 to the output terminal OUT, and the turn-off of the voltage-withstanding N-type transistor circuit 150 makes the output terminal OUT accumulates electric charges based on the injected current. As a result, the output voltage Vout increases to be at the second power domain high state (VDD2).

Under a second operation condition, the input voltage Vin is at the first power domain low state (0). In FIG. 1, a label "(2)" is used to mark the voltage of each of the circuit nodes in the voltage conversion circuit 100 under the second operation condition.

Since the input voltage Vin is at the first power domain low state (0), the inverted input voltage IVin is at the first power domain high state (VDD1). Under such a condition, the voltage-withstanding N-type transistor circuit 150 is controlled to be turned on by the inverted input voltage Vin.

For the switch circuit 130, when the input voltage Vin is at the first power domain low state (0), the second NMOS transistor MN22 is controlled to be turned off by the input voltage Vin such that the first NMOS transistor MN21 and the third NMOS transistor MN23 are turned off as well. Since the control current IC keeps charging the control terminal NC, the control voltage VC generated at the control terminal NC becomes VDD2.

Therefore, after receiving the input voltage Vin at the first power domain low state (0), the switch circuit 130 makes the control voltage VC the second supply voltage (VDD2). Under such a condition, the voltage-withstanding P-type transistor circuit 140 is controlled to be turned off according to the control voltage VC.

Under such a condition, the turn-off of the voltage-withstanding P-type transistor circuit 140 stops to inject the current to the output terminal OUT, and the turn-on of the voltage-withstanding N-type transistor circuit 150 drains a current from the output terminal OUT such that the output terminal OUT loses electric charges. As a result, the output voltage Vout decreases to the second power domain low state (0).

As a result, the voltage conversion circuit 100 is able to convert the input voltage Vin at the first power domain into the output voltage Vout in the second power domain no matter the first supply voltage VDD1 of the first power domain is larger or smaller than the second supply voltage VDD2 of the second power domain.

Further, by using the LDMOS transistor for implementation, a high voltage-withstanding mechanism can be accomplished between the source and the drain of each of the PMOS transistor MP1 and the NMOS transistor MN1. Further, a voltage difference between the gate and the source of each of the PMOS transistor MP1 and the NMOS transistor MN1 is kept to be not larger than the first supply voltage VDD1, which corresponds to the high state of the first power domain, due to the control voltage VC and the inverted input voltage IVin that the gates of the PMOS transistor MP1 and the NMOS transistor MN1 respectively receive. The components can thus be protected from being damaged due to large voltage differences across these components.

Figure 3:
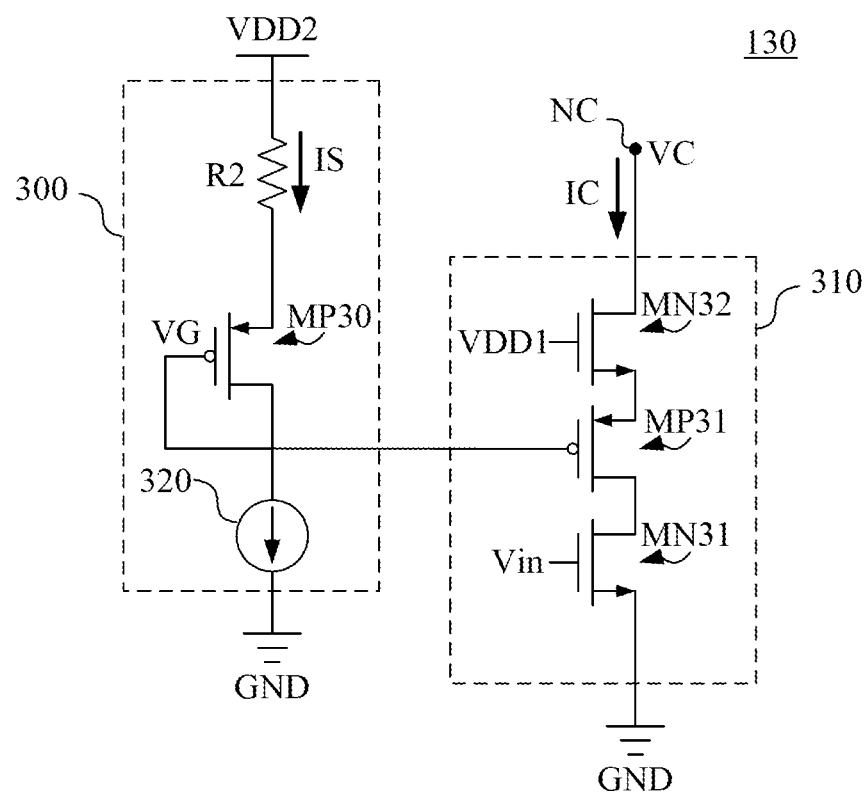
FIG. 3 illustrates a detailed circuit diagram of the switch circuit according to another embodiment of the present invention.

Reference is now made to FIG. 3. FIG. 3 illustrates a detailed circuit diagram of the switch circuit 130 according to another embodiment of the present invention. In the present embodiment, the switch circuit 130 includes a driving branch 300 and a voltage generation branch 310.

The driving branch 300 includes a current source 320, a second resistor R2 and a diode-connected PMOS transistor MP30.

The current source 320 is configured to generate the switch current IS to the ground terminal GND.

The second resistor R2 has a second resistance that is B times of the first resistance of the first resistor R1 and the second resistance is expressed to be B×R1. A first terminal of the second resistor R2 is electrically coupled to the second supply voltage VDD2.

The diode-connected PMOS transistor MP30 is electrically coupled between a second terminal of the second resistor R2 and the current source 320 and is controlled to be turned on by the gate voltage VG generated according to the switch current IS.

The voltage generation branch 310 includes a first NMOS transistor MN31, a first PMOS transistor MP31 and a second NMOS transistor MN32 electrically coupled in series between the control terminal NC and the ground terminal GND.

The first NMOS transistor MN31 is controlled by the input voltage Vin. A gate of the first PMOS transistor MP31 is electrically coupled to a gate of the diode-connected PMOS transistor MP30 and is controlled by the gate voltage VG. The second NMOS transistor MN32 is controlled by the first supply voltage VDD1.

In an embodiment, a transistor W/L ratio of the first PMOS transistor MP31 is B times of the transistor W/L ratio of the diode-connected PMOS transistor MP30. As a result, the amount of the switch current IS is a ratio between the first supply voltage VDD1 and the second resistance of the second resistor, in which the amount of the switch current IS is expressed as VDD1/R2.

As a result, when the input voltage Vin is at the first power domain high state (VDD1), the first NMOS transistor MN31 is controlled to be turned on by the input voltage Vin such that the first PMOS transistor MP31 and the second NMOS transistor MN32 are turned on as well. Due to the relation of the ratio between the transistor W/L ratios of the first PMOS transistor MP31 and the diode-connected PMOS transistor MP30, the control current IC flowing through the voltage generation branch 310 is B×(VDD1/R2)=VDD1/R1.

As a result, when the control current IC flows through the first resistor R1 in FIG. 1, a largest voltage drop generated therefrom is VDD1 (R1×(VDD1/R1)). When the second supply voltage VDD2 is larger than the first supply voltage VDD1, the control voltage VC generated at the control terminal NC is VDD2−VDD1. When the second supply voltage VDD2 is not larger than the first supply voltage VDD1, the lowest level of the control voltage VC is 0 since the ground voltage of the ground terminal GND is 0.

When the input voltage Vin is at the first power domain low state (0), the first NMOS transistor MN31 is controlled to be turned off by the input voltage Vin such that the first PMOS transistor MP31 and the second NMOS transistor MN32 are turned off as well. Since the control current IC keeps charging the control terminal NC, the control voltage VC generated at the control terminal NC becomes VDD2.

Therefore, after receiving the input voltage Vin at the first power domain low state (0), the switch circuit 130 makes the control voltage VC the second supply voltage (VDD2).

Based on the above description, no matter the input voltage Vin is at the first power domain high state or at the first power domain low state, the control voltage VC generated by the switch circuit 130 in FIG. 3 is the same as the control voltage VC generated by the switch circuit 130 in FIG. 2.

Figure 4:
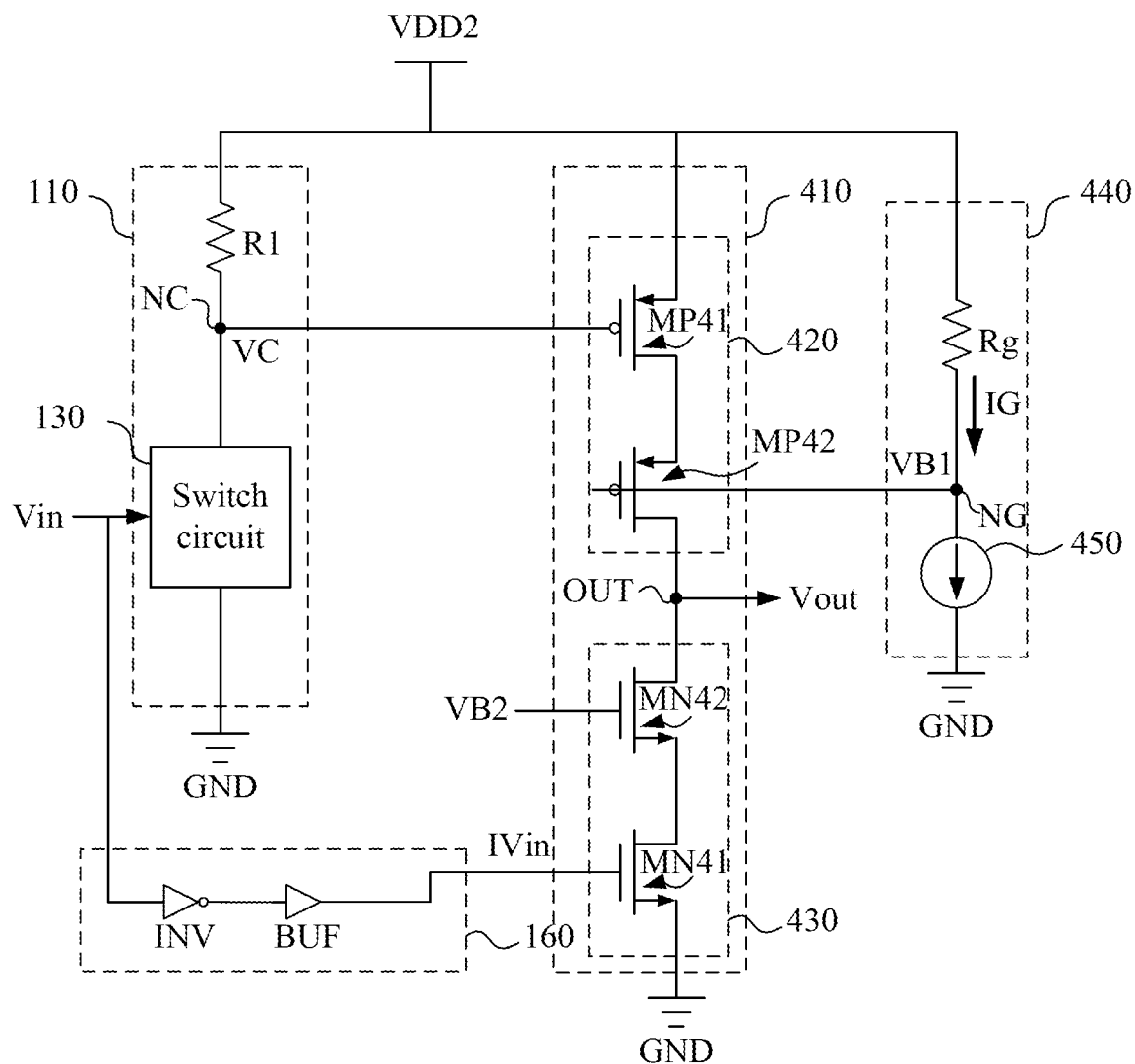
FIG. 4 illustrates a circuit diagram of a voltage conversion circuit according to another embodiment of the present invention.

Reference is now made to FIG. 4. FIG. 4 illustrates a circuit diagram of a voltage conversion circuit 400 according to another embodiment of the present invention. The voltage conversion circuit 400 in FIG. 4 includes the control branch 110 illustrated in FIG. 1. The identical components are not further described herein.

In the present embodiment, the voltage conversion circuit 400 includes an output branch 410 that includes a voltage-withstanding P-type transistor circuit 420 and a voltage-withstanding N-type transistor circuit 430.

The voltage-withstanding P-type transistor circuit 420 includes a first PMOS transistor MP41 and a second PMOS transistor MP42 electrically coupled in series. The first PMOS transistor MP41 is controlled by the control voltage VC and the operation is identical to the PMOS transistor MP1 in FIG. 1. The detail of the operation is thus not described herein.

The second PMOS transistor MP42 is controlled to always be turned on by a first conductive voltage VB1. In an embodiment, the voltage conversion circuit 400 further includes a conductive voltage generation circuit 440 configured to generate the first conductive voltage VB1.

The conductive voltage generation circuit 440 includes a voltage generation resistor Rg and a voltage generation current source 450. The voltage generation resistor Rg is electrically coupled between the second supply voltage VDD2 and the voltage generation terminal NG The voltage generation current source 450 is electrically coupled between the voltage generation terminal NG and the ground terminal GND and is configured to generate a conductive voltage generation current IG.

In an embodiment, an amount of the conductive voltage generation current IG is a ratio between the first supply voltage VDD1 and a resistance of the voltage generation resistor Rg (VDD1/Rg) such that the first conductive voltage VB1 is generated at the voltage generation terminal NG As a result, the first conductive voltage VB1 is the difference between the second supply voltage VDD2 and the first supply voltage VDD1 when the second supply voltage VDD2 is larger than the first supply voltage VDD1 and the first conductive voltage VB1 is zero when the second supply voltage VDD2 is not larger than the first supply voltage VDD1 such that the second PMOS transistor MP42 is kept to be always turned on.

The voltage-withstanding N-type transistor circuit 430 includes a first NMOS transistor MN41 and a second NMOS transistor MN42 electrically coupled in series. The first NMOS transistor MN41 is controlled by the inverted input voltage IVin, and the operation of the first NMOS transistor MN41 is identical to the NMOS transistor MN1 in FIG. 1. The detail is thus not described herein.

The second NMOS transistor MN42 is controlled to always be turned on by a second conductive voltage VB2. In an embodiment, the second conductive voltage VB2 is the first supply voltage VDD1 such that the second NMOS transistor MN42 is kept to be always turned on.

As a result, in the present embodiment, the operation of the control branch 110, the first PMOS transistor MP41 and the first NMOS transistor MN41 is actually the same as the operation of the voltage conversion circuit 100 in FIG. 1. However, due to the disposition of the second PMOS transistor MP42 and the second NMOS transistor MN42, each of the first PMOS transistor MP41 and the first NMOS transistor MN41 can be implemented by a MOS transistor having a normal voltage-withstanding ability without using the LDMOS transistors.

Figure 5:
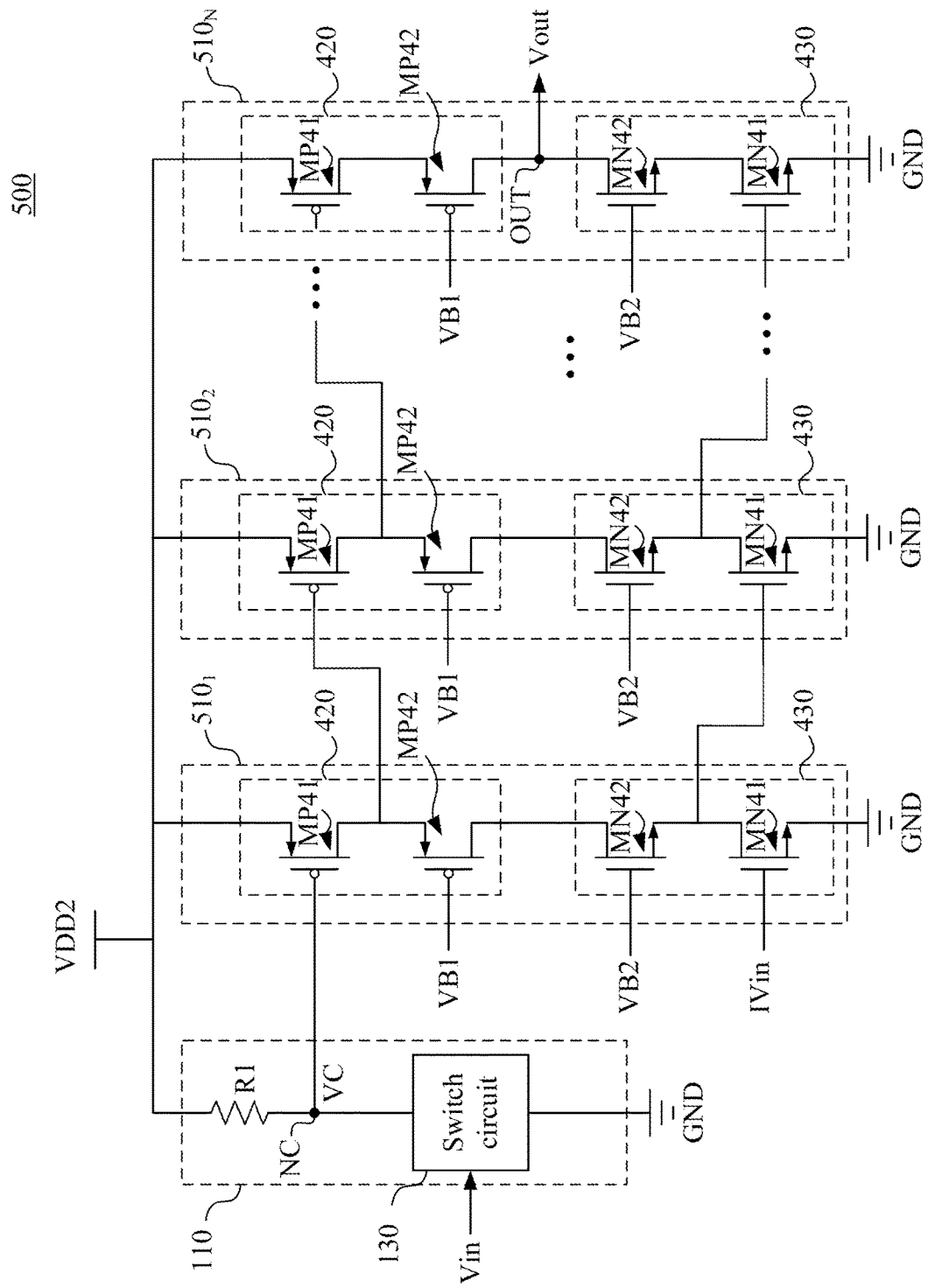
FIG. 5 illustrates a circuit diagram of a voltage conversion circuit according to another embodiment of the present invention.

Reference is now made to FIG. 5. FIG. 5 illustrates a circuit diagram of a voltage conversion circuit 500 according to another embodiment of the present invention. The voltage conversion circuit 500 in FIG. 5 includes the control branch 110 illustrated in FIG. 1. The identical components are not further described herein.

In the present embodiment, the voltage conversion circuit 500 includes output branches $510_1$~$510_N$ each including the voltage-withstanding P-type transistor circuit 420 and the voltage-withstanding N-type transistor circuit 430 illustrated in FIG. 4. The operation of the control branch 110 and the output branch $510_1$ is the same as the voltage conversion circuit 400 illustrated in FIG. 4.

However, in each of the output branches $510_2$~$510_N$, the first PMOS transistor MP41 of the voltage-withstanding P-type transistor circuit 420 is controlled by a voltage from a node that the first PMOS transistor MP41 and the second PMOS transistor MP42 of a former output branch are electrically coupled to. The second PMOS transistor MP42 of the voltage-withstanding P-type transistor circuit 420 is controlled to be always turned on by the first conductive voltage VB1.

On the other hand, in each of the output branches $510_2$~$510_N$, the first NMOS transistor MN41 of the voltage-withstanding N-type transistor circuit 430 is controlled by a voltage from a node that the first NMOS transistor MN41 and the second NMOS transistor MN42 of a former output branch are electrically coupled to. The second NMOS transistor MN42 of the voltage-withstanding N-type transistor circuit 430 is controlled to be always turned on by the second conductive voltage VB2.

The node that the second PMOS transistor MP42 and the second NMOS transistor MN42 of the output branch $510_N$ are electrically coupled to serves as the output terminal OUT configured to generate the output voltage Vout.

In an embodiment, when the input voltage Vin is operated under a higher speed, each of the MOS transistors in the output branch needs a larger transistor W/L ratio. In order to decrease the power dissipation and increase the speed, the voltage conversion circuit 500 uses a plurality of output branches $510_2$~$510_N$ electrically coupled in parallel and makes the transistor W/L ratio of each of the output branches $510_2$~$510_N$ gradually increases.

It is appreciated that the embodiments described above are merely an example. In other embodiments, it should be appreciated that many modifications and changes may be made by those of ordinary skill in the art without departing, from the spirit of the disclosure.

In summary, the voltage conversion circuit having self-adaptive mechanism of the present invention is configured to convert an input voltage at a first power domain into an output voltage in a second power domain no matter a first supply voltage of the first power domain is larger or smaller than a second supply voltage of the second power domain.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A voltage conversion circuit having self-adaptive mechanism configured to convert an input voltage corresponding to a first power domain to an output voltage corresponding to a second power domain, wherein a first power domain high state of the first power domain corresponds to a first supply voltage and a second power domain high state of the second power domain corresponds to a second supply voltage, the voltage conversion circuit comprises:

a control branch comprising:
   a first resistor electrically coupled between the second supply voltage and a control terminal; and
   a switch circuit electrically coupled between the control terminal and a ground terminal and configured to receive an input voltage from an input terminal to generate a control voltage at the control terminal; and an output branch comprising:
   a voltage-withstanding P-type transistor circuit electrically coupled between the second power supply and an output terminal and controlled by the control voltage, wherein the output terminal is configured to generate the output voltage; and
   a voltage-withstanding N-type transistor circuit electrically coupled between the output terminal and the ground terminal and controlled by an inverted input voltage that is an inversion of the input voltage;

wherein when the input voltage is at the first power domain high state, the inverted input voltage is at a first power domain low state, the control voltage is a difference between the second supply voltage and the first supply voltage when the second supply voltage is larger than the first supply voltage and the control voltage is zero when the second supply voltage is not larger than the first supply voltage, and the output voltage is at the second power domain high state;

when the input voltage is at the first power domain low state, the inverted input voltage is at the first power domain high state, the control voltage is the second supply voltage, and the output voltage is at a second power domain low state.

2. The voltage conversion circuit of claim 1, wherein when the input voltage is at the first power domain high state, the inverted input voltage turns off the voltage-withstanding N-type transistor circuit and the control voltage turns on the voltage-withstanding P-type transistor circuit; and
   when the input voltage is at the first power domain low state, the inverted input voltage turns on the voltage-withstanding N-type transistor circuit and the control voltage turns off the voltage-withstanding P-type transistor circuit.

3. The voltage conversion circuit of claim 1, wherein the voltage-withstanding P-type transistor circuit comprises a PMOS transistor and the voltage-withstanding N-type transistor circuit comprises a NMOS transistor, and each of the PMOS transistor and the NMOS transistor is a laterally diffused metal oxide semiconductor (LDMOS) transistor.

4. The voltage conversion circuit of claim 1, wherein the voltage-withstanding P-type transistor circuit comprises a first PMOS transistor and a second PMOS transistor electrically coupled in series, the first PMOS transistor is controlled by the control voltage, and the second PMOS transistor is controlled to always be turned on by a first conductive voltage, in which the first conductive voltage is the difference between the second supply voltage and the first supply voltage when the second supply voltage is larger than the first supply voltage and the first conductive voltage is zero when the second supply voltage is not larger than the first supply voltage; and
   the voltage-withstanding N-type transistor circuit comprises a first NMOS transistor and second NMOS transistor electrically coupled in series, the first NMOS transistor is controlled by the inverted input voltage, and the second NMOS transistor is controlled to always be turned on by a second conductive voltage, wherein the second conductive voltage is the first supply voltage.

5. The voltage conversion circuit of claim 4, further comprising a conductive voltage generation circuit that comprises:
   a voltage generation resistor electrically coupled between the second supply voltage and a voltage generation terminal; and
   a voltage generation current source electrically coupled between the voltage generation terminal and the ground terminal and configured to generate a conductive voltage generation current;
   wherein an amount of the conductive voltage generation current is a ratio between the first supply voltage and a resistance of the voltage generation resistor such that the first conductive voltage is generated at the voltage generation terminal.

6. The voltage conversion circuit of claim 1, wherein the switch circuit comprises:
   a driving branch comprising:
      a current source configured to operate according to the first supply voltage to generate a switch current; and
      a diode-connected NMOS transistor electrically coupled between the current source and the ground terminal and controlled to be turned on by a gate voltage generated according to the switch current; and
   a voltage generation branch comprising a first NMOS transistor, a second NMOS transistor and a third NMOS transistor electrically coupled in series between the control terminal and the ground terminal, wherein the first NMOS transistor is controlled by the gate voltage, the second NMOS transistor is controlled by the input voltage and the third NMOS transistor is controlled by the first supply voltage;
   wherein a transistor W/L ratio of the first NMOS transistor is A times of the transistor W/L ratio of the diode-connected NMOS transistor, and an amount of the switch current is a ratio between the first supply voltage and A times of a first resistance of the first resistor.

7. The voltage conversion circuit of claim 1, wherein the switch circuit comprises:
   a driving branch comprising:
      a current source configured to generate a switch current to the ground terminal;
      a second resistor having a second resistance that is B times of a first resistance of the first resistor, and a first terminal of the second resistor is electrically coupled to the second supply voltage; and
      a diode-connected PMOS transistor electrically coupled between a second terminal of the second resistor and the current source and controlled to be turned on by a gate voltage generated according to the switch current; and
   a voltage generation branch comprising a first NMOS transistor, a first PMOS transistor and a second NMOS transistor electrically coupled in series between the control terminal and the ground terminal, wherein the first NMOS transistor is controlled by the input voltage, the first PMOS transistor is controlled to be turned on by the gate voltage and the second NMOS transistor is controlled to be turned on by the first supply voltage;
   wherein a transistor W/L ratio of the first PMOS transistor is B times of the transistor W/L ratio of the diode-connected PMOS transistor, and an amount of the switch current is a ratio between the first supply voltage and the second resistance of the second resistor.

8. The voltage conversion circuit of claim 1, further comprising:
an inverting circuit comprising an inverter and selectively comprising at least one buffer electrically coupled to the inverter in series, to receive the input voltage and generate the inverted input voltage;
wherein a number of the buffer makes a time that the voltage-withstanding P-type transistor circuit receives the control voltage and a time that the voltage-withstanding N-type transistor circuit receives the inverted input voltage substantially the same.

9. The voltage conversion circuit of claim 1, wherein a number of the output branch is more than one.

10. The voltage conversion circuit of claim 1, wherein the first supply voltage is 3.3 volts and the second supply voltage is either 5 volts, 3.3 volts or 1.8 volts.

* * * * *